United States Patent
Chen

(10) Patent No.: US 7,929,856 B2
(45) Date of Patent: Apr. 19, 2011

(54) IMAGING SYSTEM AND METHOD FOR CAPTURING STILL IMAGE

(75) Inventor: Ming-Kun Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 218 days.

(21) Appl. No.: 12/136,778

(22) Filed: Jun. 11, 2008

(65) Prior Publication Data

US 2009/0169195 A1    Jul. 2, 2009

(30) Foreign Application Priority Data

Dec. 28, 2007 (CN) .......................... 2007 1 0203511

(51) Int. Cl.
    *G03B 7/093*     (2006.01)
(52) U.S. Cl. ..................................... 396/247; 348/229.1
(58) Field of Classification Search .................. 396/154, 396/247; 348/229.1, 366
See application file for complete search history.

(56) References Cited

U.S. PATENT DOCUMENTS

| | | | | |
|---|---|---|---|---|
| 4,914,518 A * | 4/1990 | Suga | ............................. | 348/296 |
| 5,734,424 A * | 3/1998 | Sasaki | ........................ | 348/222.1 |
| 6,667,765 B1 * | 12/2003 | Tanaka | ........................ | 348/229.1 |
| 6,778,212 B1 * | 8/2004 | Deng et al. | ................. | 348/222.1 |
| 2002/0039137 A1 * | 4/2002 | Harper et al. | ................. | 348/207 |
| 2002/0191086 A1 * | 12/2002 | Masuyama | ................ | 348/229.1 |
| 2003/0184661 A1 * | 10/2003 | Yubata et al. | ............. | 348/229.1 |
| 2004/0017487 A1 * | 1/2004 | Ueda | .......................... | 348/222.1 |
| 2004/0212723 A1 * | 10/2004 | Lin | ............... | 348/362 |
| 2005/0248666 A1 * | 11/2005 | Kim et al. | ................. | 348/230.1 |
| 2006/0124863 A1 * | 6/2006 | Maruno et al. | ............. | 250/484.2 |
| 2007/0047945 A1 * | 3/2007 | Nose et al. | ..................... | 396/157 |
| 2007/0052839 A1 * | 3/2007 | Kong et al. | .................. | 348/364 |
| 2007/0116453 A1 * | 5/2007 | Uchiyama | .................... | 396/246 |
| 2008/0186393 A1 * | 8/2008 | Lee et al. | ...................... | 348/301 |
| 2008/0298789 A1 * | 12/2008 | Ohki | ............... | 396/52 |

FOREIGN PATENT DOCUMENTS

WO    WO 2006057122 A1 *    6/2006

* cited by examiner

*Primary Examiner* — Christopher E Mahoney
*Assistant Examiner* — Fang-Chi Chang
(74) *Attorney, Agent, or Firm* — Zhigang Ma

(57) ABSTRACT

An exemplary method for capturing a still image includes: measuring a theoretic exposure time that is suitable for current ambient light conditions; controlling a charge coupled device image sensor to expose itself for a real exposure time according to the determined theoretic exposure time to capture an image signal; and adjusting the captured image signal according to a ratio of the theoretic exposure time to the real exposure time.

2 Claims, 4 Drawing Sheets and METHOD FOR CAPTURING STILL IMAGE

BACKGROUND

1. Technical Field

The invention relates to imaging systems and, particularly, to an imaging system and method for capturing a still image.

2. Description of Related Art

Referring to FIG. 4, 'VD' and 'CCD exposure' are timing lines of vertical sync pulses (VD) and charge coupled device (CCD) exposure amounts of CCD applications respectively. 'Preview time' and 'Image capture time' are periods before and after a final image is generated respectively. Generally, still image capture is categorized as high speed work, it typically involves exposing a CCD image sensor for an exposure time greatly shorter than a VD cycle time. This methodology almost always requires helps from special technologies. For example, referring to 'Vsub' timing line of FIG. 4, a high substrate voltage (Vsub) is used to clear CCD content, and thereby determine the exposure time, also known as electronic shutter technology. Additionally, referring to 'Mechanical shutter' and 'Image data' timing lines of FIG. 4, a mechanical shutter is used to block incoming light during a read image time, which is substantially successive to the exposure time in image capture time. In order to capture objects in motion and/or in bright light, an extremely short exposure time, e.g., 1/2000 s may be required. However, this raises two issues: (1) smear effect may be induced or aggravated in the CCD image sensor, since the degree of smear effect is inversely proportional to the exposure time; and (2) an extremely high-speed mechanical shutter is needed, which may be unachievable because mechanical devices have their speed limitation.

Therefore, it is desirable to provide an imaging system and a method for capturing a still image, which can overcome the above-mentioned problems.

SUMMARY

In a exemplary embodiment, a method for capturing a still image includes: measuring a theoretic exposure time that is suitable for current ambient light conditions; controlling a CCD image sensor to expose itself for a real exposure time according to the determined theoretic exposure time to capture an image signal; and adjusting the captured image signal according to a ratio of the theoretic exposure time to the real exposure time.

BRIEF DESCRIPTION OF THE DRAWINGS

Many aspects of the present imaging system and method should be better understood with reference to the following drawings. The components in the drawings are not necessarily drawn to scale, the emphasis instead being placed upon clearly illustrating the principles of the present imaging system and method. Moreover, in the drawings, like reference numerals designate corresponding parts throughout the several views.

DETAILED DESCRIPTION OF THE EMBODIMENTS

Embodiments of the present imaging system and method will now be described in detail with reference to the drawings.

Figure 1:
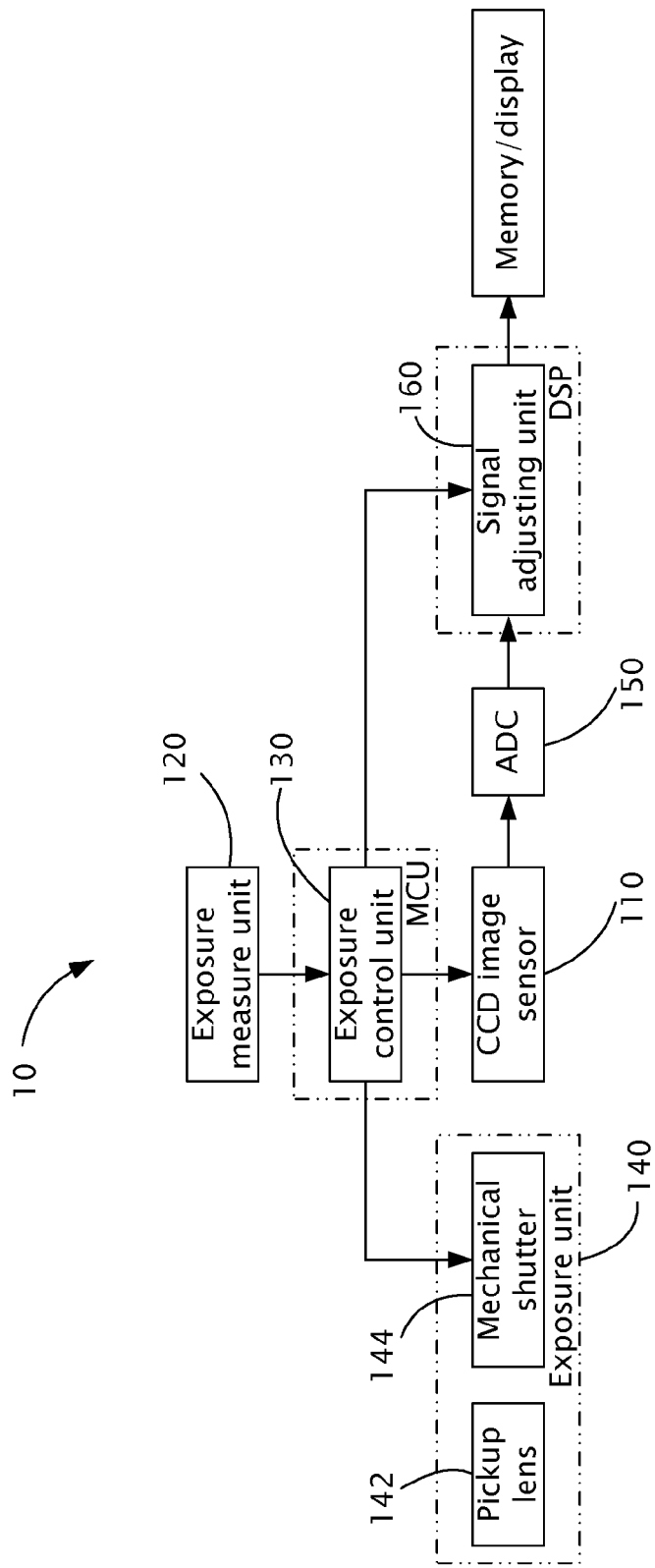
FIG. 1 is a functional diagram of an imaging system for capturing a still image, according to an exemplary embodiment.

Referring to FIG. 1, an imaging system 10 of an exemplary embodiment includes a charge coupled device (CCD) image sensor 110, an exposure measure unit 120, an exposure control unit 130, an exposure unit 140, an analog-to-digital converter (ADC) 150, and a signal adjusting unit 160. The CCD image sensor 110 is configured for converting incident light thereon into image signals. The exposure measure unit 120 is configured for metering the light incident on the CCD image sensor 110, and thereby determining a theoretic exposure time, which is suitable for the current ambient light conditions. The exposure control unit 130 is configured for controlling the CCD image sensor 110 to expose to the light incident thereon for a real exposure time based upon the determined theoretic exposure time, and the sensor 110 thereby captures an image signal. The exposure unit 140 includes a pickup lens 142 and a mechanical shutter 144. The pickup lens 142 is configured for directing the incident light to the CCD image sensor 110. The mechanical shutter 144 is configured for exposing the CCD image sensor 110 to the incident light during the preview time and the real exposure time, but blocking the incident light after the real exposure time elapses for reading the captured image signal (see following). The ADC 150 is configured for digitizing the captured image signal. The signal adjusting unit 160 is configured for adjusting the captured image signal according to a ratio of the theoretic exposure time to the real exposure time. For example, the signal adjustment unit 160 increases or decreases the brightness of the image signal based on the ratio. Detailedly, when the ratio is greater than 1, the signal adjustment unit 160 reduces the brightness of the image signal using the ratio. Conversely, the signal adjustment unit 160 increases the brightness of the image signal using the ratio. The result will be a correctly exposed image with an extreme short exposure time, and is next stored in a memory and/or shown on a display.

Various components of the imaging system 10 such as the exposure measure unit 120, the exposure control unit 130, and the signal adjusting unit 160 can be integrated into a single control unit, or one more units. For example, the exposure measure unit 120 and the signal adjusting unit 160 are integrated into a digital signal processor (DSP), and the exposure control unit 130 is integrated into a micro control unit (MCU), or are individual elements, for example, the exposure measure unit 120 is a chip including a photo-resistor. Alternatively, such components can instead be software instructions written via a variety of software languages, including C, C++, Java, Visual Basic, and many others, and can be executed by hardware such as a field-programmable gate array (FPGA) or an application specific integrated circuit (ASIC) to acquire the above-mentioned functionality of the components.

The exposure control unit 130 can store a number of control settings each associating a determined theoretic exposure time with a corresponding real exposure time and a ratio therebetween, and thereby is capable of automatically determining the real exposure time and the ratio for signal adjustment after the theoretic exposure time is determined. This methodology can be named and shown on the user interface as 'auto mode'. Alternatively, the real exposure time and the ratio also can be manually determined by the user. Accordingly, this methodology can be named and shown as 'manual mode'. For example, if the 'manual mode' is chosen, the imaging system 10 indicates the determined theoretic exposure time, then the user can select a real exposure time based on his judgement, thereby determining the ratio.

It should be understood that the real exposure time can equal the theoretic exposure time. In this case, the CCD image sensor 110 is exactly exposed, and accordingly the ratio therebetween is '1' (zero-adjustment, i.e., no adjustment is implemented) if the theoretic exposure time is long enough to be handled effectively by the mechanical shutter 144.

Figure 2:
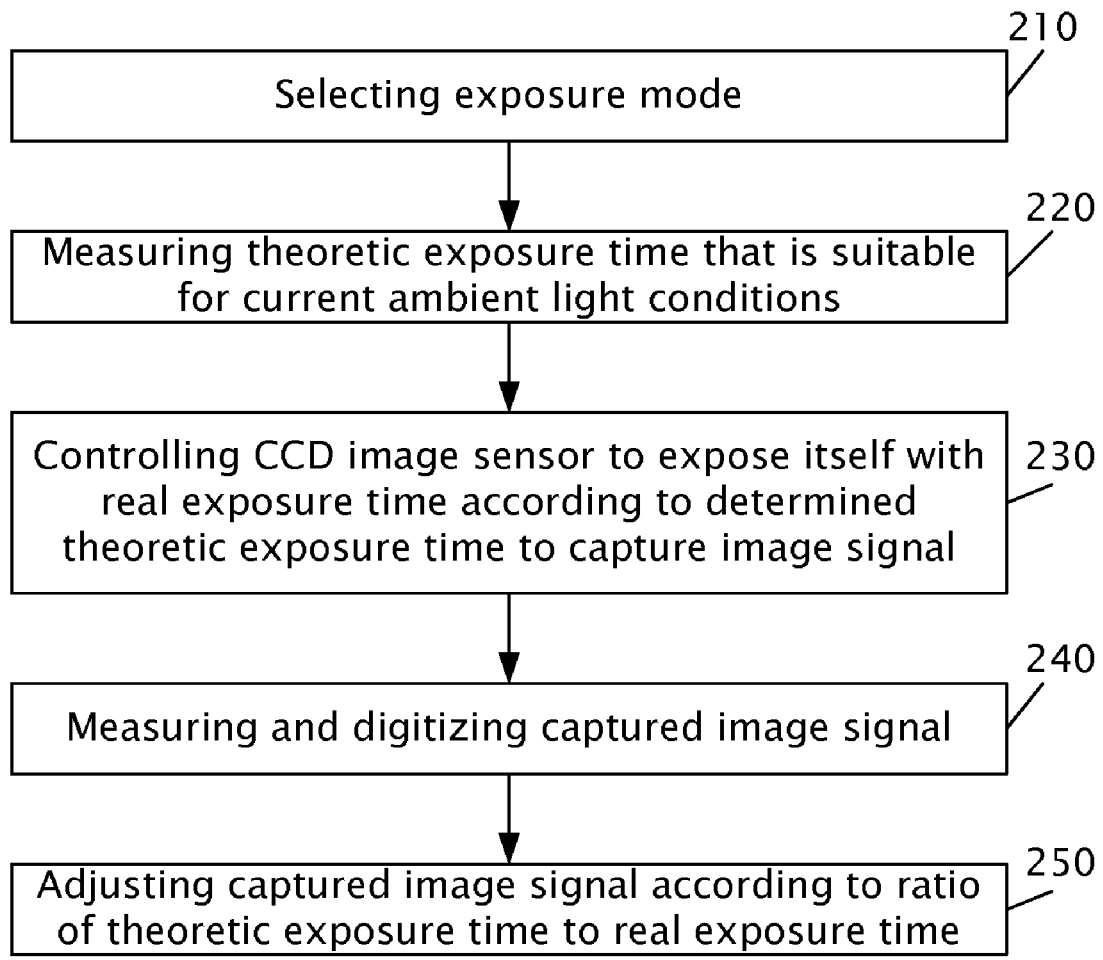
FIG. 2 is a flowchart of a method for capturing a still image, according to another exemplary embodiment.
Figure 3:
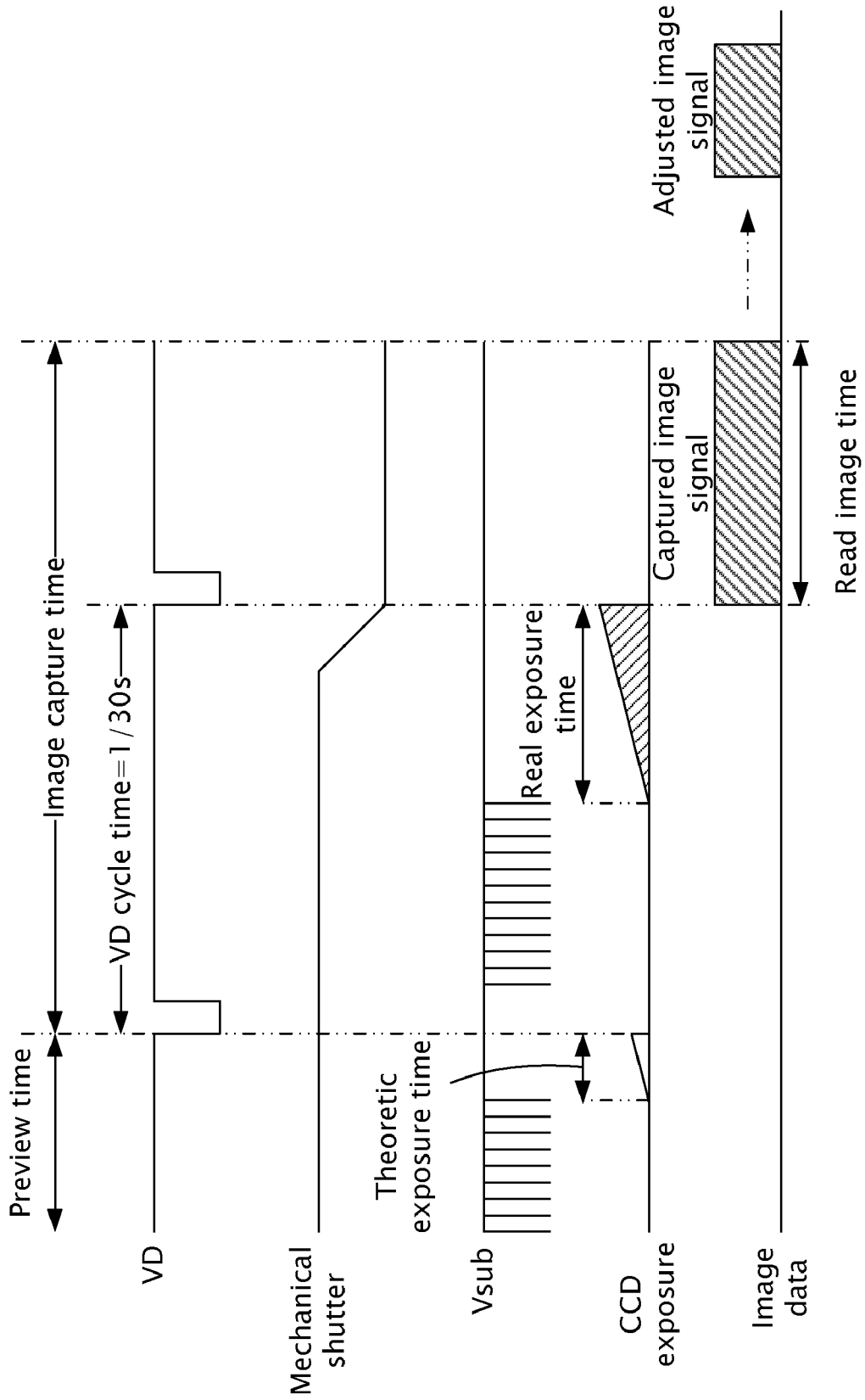
FIG. 3 is a timing chart of the method of FIG. 2.
Figure 4:
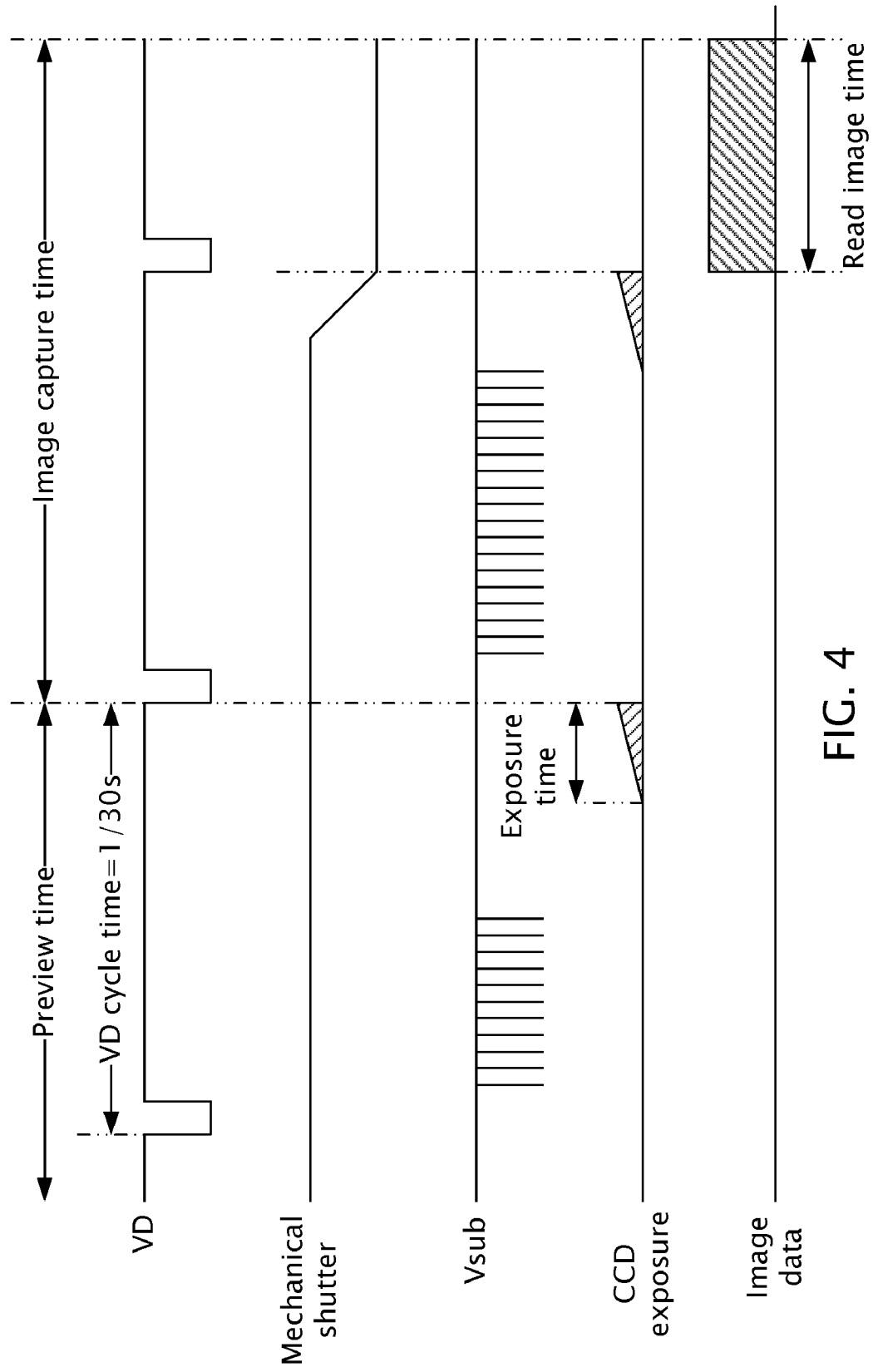
FIG. 4 is a timing chart of a method for capturing a still image, according to a related art.

Referring to FIGS. 2~3, a method capable of obtaining a still image of extreme short exposure time, according to another embodiment, includes the following steps 210~250. The method can be performed by, for example, the imaging system 10. In FIG. 3, 'VD', 'Mechanical shutter', 'Vsub', 'CCD exposure' and 'Image data' are timing lines of vertical sync pulses, the mechanical shutter 144, a high substrate voltage, exposure amounts of the CCD image sensor 110, and the image data of the system 10 respectively. 'Preview time' and 'Image capture time' are periods before the real exposure is performed and after the measuring exposures are done respectively. 'Read image time' is period the CCD image sensor 110 reading out the captured image signal. Areas of 'Captured image signal' and adjusted image signal respectively represent brightness degrees of the image signals.

Step 210: selecting an exposure mode. This can be done by the user during the preview time. As an example, the 'auto mode' is selected in this step.

Step 220: metering incident light on a CCD image sensor and determining a theoretic exposure time that is suitable for the current ambient light conditions (measuring the theoretic exposure time). This can be carried out by the exposure measure unit 120 by sampling data from generated image signals of the CCD image sensor 110 during the preview time.

Step 230: controlling the CCD image sensor 110 to expose itself to the incident light for a real exposure time, according to the determined theoretic exposure time, to capture an image signal. This can be carried out by the exposure control unit 130. In detail, the exposure control unit 130 manually or automatically, depending on which exposure mode is selected in the step 210, determines the real exposure time, and discontinuously applies Vsub to the CCD image sensor 110 so as to obtain a desirable CCD exposure, and closes the mechanical shutter 144 to end exposure of the CCD, synchronized with the incoming VD.

Step 240: reading/outputting the image signal. This is carried out by the CCD image sensor 110, and the image signal is digitized by the ADC 150.

Step 250: adjusting the image signal according to the ratio of the theoretic exposure time to the real exposure time. This can be carried out by the signal adjusting unit 160.

The imaging system and method can restrain the smear effect and decrease the speed requirement of the mechanical shutter (therefore decreasing the cost and enhancing the stability thereof) when capturing of a still image requires an extremely short exposure time, therefore is advantageous.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An imaging system comprising:
a charge coupled device image sensor;
an exposure measure unit configured for metering light incident on the charge coupled device image sensor and determining a theoretic exposure time which is suitable for current ambient light conditions;
an exposure control unit configured for controlling the charge coupled device image sensor to expose itself to the light incident thereon for a real exposure time, according to the determined theoretic exposure time, to capture an image signal;
an exposure unit including a mechanical shutter, the mechanical shutter being configured for exposing the charge coupled device image sensor to the incident light for the real exposure time and blocking the incident light after the real exposure time elapses; and
a signal adjusting unit for adjusting the captured image signal according to a ratio of the theoretic exposure time to the real exposure time;
wherein the exposure control unit is configured for storing a plurality of control settings each of which associates a theoretic exposure time with a real exposure time and a ratio therebetween, and the exposure control unit being capable of automatically determining the real exposure time and the ratio.

2. A method for capturing a still image, comprising:
measuring a theoretic exposure time that is suitable for current ambient light conditions;
controlling a charge coupled device image sensor to expose itself for a real exposure time based upon the determined theoretic exposure time to capture an image signal; and
adjusting the captured image signal according to a ratio of the theoretic exposure time to the real exposure time;
wherein a step of determining the real exposure time according to the determined theoretic exposure time is automatically performed by referring to a plurality of predetermined settings each associating a theoretic exposure time with a corresponding real exposure time and a corresponding ratio.

\* \* \* \* \*